United States Patent
Toms

(10) Patent No.: US 6,216,806 B1
(45) Date of Patent: Apr. 17, 2001

(54) SUPPLEMENT STEERING SYSTEM

(75) Inventor: Robert D. Toms, Sycamore, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/348,789

(22) Filed: Jul. 7, 1999

(51) Int. Cl.[7] .................................................. B62D 6/00
(52) U.S. Cl. ..................... 180/6.2; 180/417; 180/441; 180/442
(58) Field of Search .................. 180/6.2, 6.3, 6.24, 180/6.62, 6.44, 165, 306, 417, 441, 442; 137/101; 74/730.1, 473.11

(56) References Cited

U.S. PATENT DOCUMENTS

| | | | | |
|---|---|---|---|---|
| 3,603,424 | * | 9/1971 | Blood et al. ........................... | 180/6.2 |
| 3,662,548 | * | 5/1972 | Suzuki et al. ............................ | 60/51 |
| 3,768,871 | * | 10/1973 | Meyers ..................................... | 303/9 |
| 3,796,134 | * | 3/1974 | Kaptrosky ............................... | 91/418 |
| 3,877,537 | | 4/1975 | Ohms et al. ............................ | 180/6.3 |
| 3,879,948 | * | 4/1975 | Flory ....................................... | 60/548 |
| 3,898,809 | * | 8/1975 | Baker ...................................... | 60/404 |
| 3,915,186 | * | 10/1975 | Thomas .................................. | 137/101 |
| 4,070,858 | * | 1/1978 | Hand ....................................... | 60/422 |
| 4,142,842 | | 3/1979 | Hicks et al. ........................... | 417/288 |
| 4,183,421 | * | 1/1980 | Brown .................................... | 180/145 |
| 4,199,946 | * | 4/1980 | Wilson et al. ........................ | 60/547 B |
| 4,407,547 | * | 10/1983 | Edwards ................................. | 303/6 A |
| 4,420,934 | * | 12/1983 | Udono .................................... | 60/422 |
| 4,440,453 | * | 4/1984 | Adachi .................................... | 303/50 |
| 4,505,168 | | 3/1985 | Booth et al. ........................... | 74/687 |
| 4,645,026 | * | 2/1987 | Adams .................................... | 180/442 |
| 4,702,330 | * | 10/1987 | Vatter et al. ............................ | 180/6.2 |
| 4,949,823 | | 8/1990 | Coutant et al. ........................ | 192/4 C |
| 5,375,686 | * | 12/1994 | Yamamoto ............................. | 192/13 R |

OTHER PUBLICATIONS

U.S. application Ser. No. 09/093,203 filed Jun. 8, 1998, entitled "Supplemental Steering Control for a Differential Steer Machine." Patent #6029761.

* cited by examiner

Primary Examiner—Brian L. Johnson
Assistant Examiner—Daniel Yeagley
(74) Attorney, Agent, or Firm—Haverstock, Garrett & Roberts; J. W. Burrrows

(57) ABSTRACT

A supplemental steering system is provided for a machine having first and second brakes actuable for slowing rotation of first and second drive outputs or wheels, a brake actuator, and a main or primary steering system. The brake actuator is connected with a first port and a second port of a supplemental steering control valve having a first chamber and a second chamber. The first port communicates with the first chamber and the second port communicates with the second chamber. The supplemental steering control valve further includes a piston located in the bore connected to a steering input and having a neutral position generally equidistant between the first and second chambers. First and second brake ports respectively communicate the first and second chambers with the first brake. The piston is movable in a first direction a predetermined distance into the first chamber to close the first port such that further movement of the piston in the first direction will urge brake fluid in the first chamber through the first brake port to actuate the first brake, and movement of the piston in a second direction actuates the second brake.

15 Claims, 5 Drawing Sheets

SUPPLEMENT STEERING SYSTEM

TECHNICAL FIELD

This invention relates generally to a supplemental steering system and more specifically to a supplement steering system for a machine or vehicle operable for providing supplemental steering through steering input controlled differential brake application when an emergency condition such as a low pressure condition in a primary or main steering system or an engine stalling condition is present.

BACKGROUND ART

There are many types of supplemental steering controls known in the art. Many of the known supplemental steering controls use a pressure storage device such as an accumulator to store pressurized fluid that can be used to provide pressurized fluid for steering in the event the main steering control fails. In other steering systems, a steering control valve having a HMU (hand metering unit) is used during emergency conditions. In these systems, the HMU is used to provide pressurized fluid to steer the machine in the event the main steering pump flow is lost.

In other steering control systems, a differential steer mechanism is used to provide the steering of the machine. In many of these differential steering units, individual steer motors are connected to the differential steer mechanism and operate to either increase or decrease the speed of the respective outputs that provide the driving force to the machine. By increasing or decreasing the speed of one of the outputs relative to the other output, the machine turns in the direction of the slowest output speed. In differential steered machines, each of the outputs are always under a continuous driving force, even when the machine is being steered. By using two different steering motors connected to the respective outputs, during an emergency steering control it is possible to provide stored pressurized fluid to one or the other of the steering motors to steer the machine. Since fluid motors normally require a volume of pressurized fluid to provide the force on a continuous basis to provide the needed differential between the two outputs, it is many times not practical to try to store the needed pressurized fluid.

In other differential steer machines, a single fluid motor is connected to the differential steer mechanism. In these differential steer mechanisms, the single steer motor provides an input into the differential steer mechanism to increase the speed of one of the outputs and simultaneously decrease the speed of the other of the outputs. When the single steer motor is not receiving pressurized fluid to cause rotation of its output, the drive outputs from the differential steer mechanism are mechanically locked together by the non-rotating fluid motor. As noted above, with respect to the differential steer mechanism having two steering motors, it is not practical to use accumulators for storage of pressurized fluid for emergency steering since the volume of pressurized fluid needed for a longer duration of emergency steering is too large.

It has also been known to provide a complete redundant emergency steering control but these systems are normally cost prohibitive. In machines not having differential steering mechanisms, it is well known to use brakes on the drive outputs to individually slow one output relative to the other in order to steer the machine. In these machines, when the one drive output is braked, the power is transferred across a standard differential to the other drive output.

In machines having differential steer mechanisms with only one steering motor, attempting to brake one output is not successful since both outputs are under a continuous driving force. Consequently, the machine will not respond to attempts to steer by braking since the non-rotating fluid motor has the two outputs locked together. In these differential steered machines, even attempts to install larger brakes of very high capacity will not provide adequate steering by braking. Even if it did provide some steer control, the size of the brakes would be cost prohibitive.

Accordingly, the present invention is directed to overcoming one or more of the problems as set forth above.

DISCLOSURE OF THE INVENTION

In one aspect of the present invention, a supplemental steering system is provided for a vehicle having a first brake actuable for slowing rotation of a first drive output or wheel, a second brake actuable for slowing rotation of a second drive output or wheel, a brake actuator including a reservoir of brake fluid adapted for connection to the first and second brakes for directing the brake fluid under pressure to the first and second brakes, and a main or primary steering system. The brake actuator includes a port connected in fluid communication with a first port and a second port of a supplemental steering control valve, the supplemental steering control valve including a valve body defining a bore divided into a first chamber and a second chamber, the first port communicating with the first chamber and the second port communicating with the second chamber. The supplemental steering control valve further includes a piston located in the bore connected to a steering input and having a neutral position generally equidistant between the first and second chambers, a first brake port communicating the first chamber with the first brake, and a second brake port communicating the second chamber with the second brake. The piston is movable in a first direction a predetermined distance into the first chamber to close the first port such that further movement of the piston in the first direction will urge brake fluid in the first chamber through the first brake port to actuate the first brake, and the piston is movable in a second direction a predetermined distance into the second chamber to close the second port such that further movement into the second chamber will urge brake fluid contained therein through the second brake port to actuate the second brake.

According to another aspect of the invention, the present supplemental steering system includes a second valve, the second valve including a first port connected in fluid communication with the first brake port, a second port connected in fluid communication with the second brake port and a signal input connected in communication with a suitable signal source for operating the valve, a signal source operable for generating a signal representative of a predetermined fluid pressure condition in the primary or main steering system, the second valve being operable to allow fluid flow therethrough between the first port thereof and the second port thereof when the signal representative of the predetermined fluid pressure condition is present, and to prevent flow between the first port thereof and the second port thereof when the signal is absent. The signal can be a fluid signal or an electrical signal, and the predetermined fluid pressure condition is preferably representative of a normal operating condition for the primary or main system. The absence of the predetermined condition is indicative of an emergency condition, such as a low pressure condition in the primary steering system, such as a low charge pump pressure indicative of a failure such as a leak, or a broader problem such as an engine stall or shut down or the like.

BEST MODE FOR CARRYING OUT THE INVENTION

Figure 1:
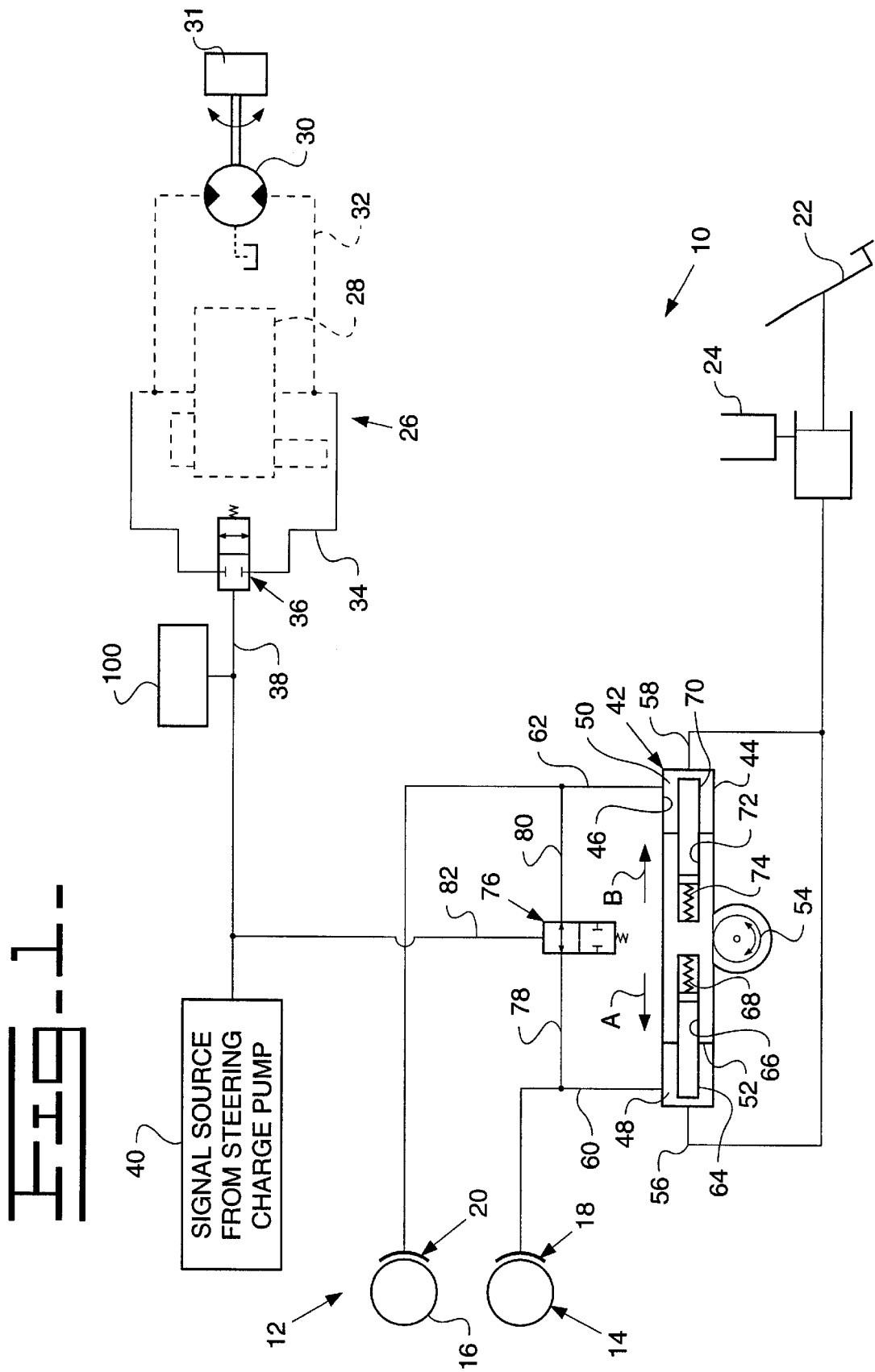
FIG. 1 is a partial diagrammatic and a partial schematic representation of an embodiment of a supplemental steering system for a machine incorporating the subject invention.

Referring to the drawings, in FIG. 1 a supplemental steering system 10 constructed and operable according to the teachings of the present invention is provided for supplementing the steering of a machine 12 (partially shown). Machine 12 includes a rotatable first drive output 14 disposed between a drive wheel or sprocket for an endless belt or track (not shown) of machine 12 and a propulsion source thereof such as an engine (also not shown). Machine 12 includes a rotatable second drive output 16 disposed between a second drive wheel or sprocket and the propulsion source. Machine 12 includes a conventionally constructed fluid actuated first brake 18 disposed for slowing and/or stopping rotation of first drive output 14, a fluid actuated second brake 20 disposed for slowing and/or stopping rotation of second drive output 16, and a hydraulic brake actuator 22 including a brake fluid reservoir 24. Brake actuator 22 shown is a conventionally hand or foot pedal operated device operable for supplying the brake fluid under pressure to brakes 18 and 20, but is also intended to be representative of other known brake actuators as well. Additionally, here it should be noted that first and second brakes 18 and 20 could alternatively be associated with non-driving wheels of a machine such as the front wheels of a rear drive machine or the like.

Machine 12 further includes a primary steering system 26 including a steering pump 28, a steering motor 30, a differential steering mechanism 31 and a fluid loop 32 extending therebetween. Steering system 26 includes a bypass loop 34 including a bypass valve 36 operable in an open position to allow fluid flow to bypass steering pump 28 thus allowing steering motor 30 to freely turn when a normal operating signal is absent at a signal input 38 of valve 36, the absence of the signal being representative of a low pressure condition in a pilot pump or a steering charge pump (not shown) disposed for supplying control fluid and/or makeup fluid to primary steering system 26. The normal operating signal is preferably generated by a signal source 40 which can be a conventional transducer or the like operable for generating an output signal representative of a pressure condition. Here, it should be understood that it is contemplated that valve 36 could be a fluid pilot signal controlled valve, or an electrical signal controlled valve such as a solenoid valve or the like, signal source 40 being desired for providing the appropriate type signal for the type of valve used. The steering charge pump is used as the signal source because an absence of pressure therein is indicative of a serious problem that can negatively affect operation of primary steering system 26, such as a leak in fluid loop 32, or an engine failure or stall, although it should be recognized that another portion of machine 12 could likewise be used as a signal source such as an engine controller or the like.

Figure 3:
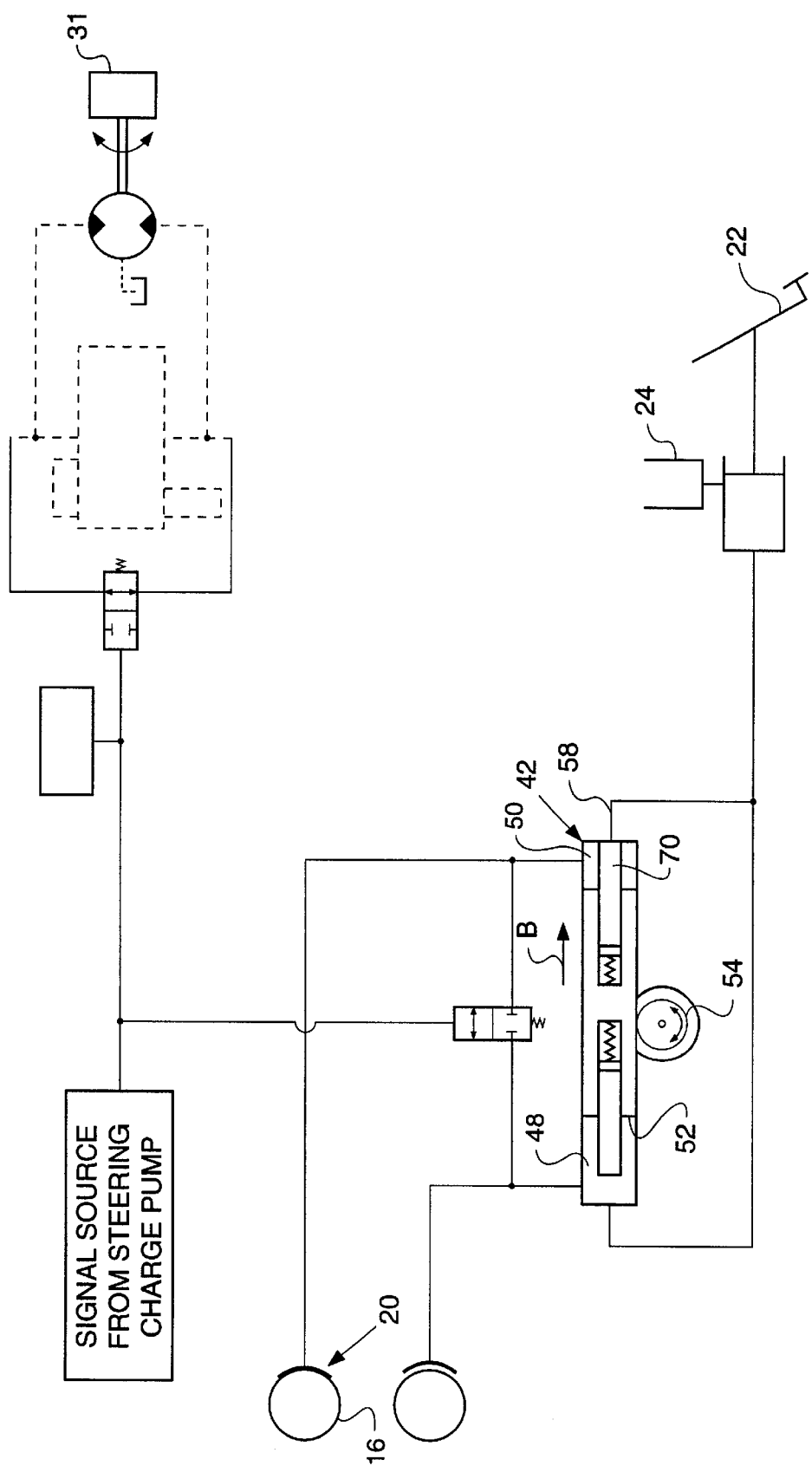
FIG. 3 is another partial diagrammatic and partial schematic representation of the supplemental steering system of FIG. 1, showing the supplemental steering system actuated and with a steering input to the system.

Supplemental steering system 10 includes a supplemental steering control valve 42 including a valve body 44 defining a bore 46 divided into a first chamber 48 and a second chamber 50. A piston 52 is movably located in bore 46. Piston 52 is connected to a steering input 54 which in turn can be connected to, or form part of, a rack and pinion, a cam arrangement, an electrical actuator, a linkage arrangement, or the like, rotatable by a conventional steering wheel (not shown) for moving piston 52. Piston 52 is movable by steering input 54 in a first direction from a neutral or center position, as shown, into first chamber 48, as denoted by arrow A, and in an opposite direction into second chamber 50 as denoted by the arrow B, as shown in FIG. 3. Valve 42 includes a first port 56 connecting first chamber 48 in fluid communication with brake actuator 22, and a second port 58 connecting second chamber 50 in fluid communication therewith. Valve 42 additionally includes a first brake port 60 connecting first chamber 48 in fluid communication with first brake 18, and a second brake port 62 connecting second chamber 50 in fluid communication with second brake 20. Piston 52 includes a first check valve 64 located partially within a blind bore 66 containing a spring 68, check valve 64 being positioned to cover or close first port 56 when piston 52 is moved a predetermined distance into first chamber 48. Similarly, piston 52 includes a second check valve 70 extending partially into a blind bore 72 containing a spring 74, second check valve 70 being positioned to cover or close second port 58 when piston 52 is moved a predetermined distance into second chamber 50.

Figure 2:
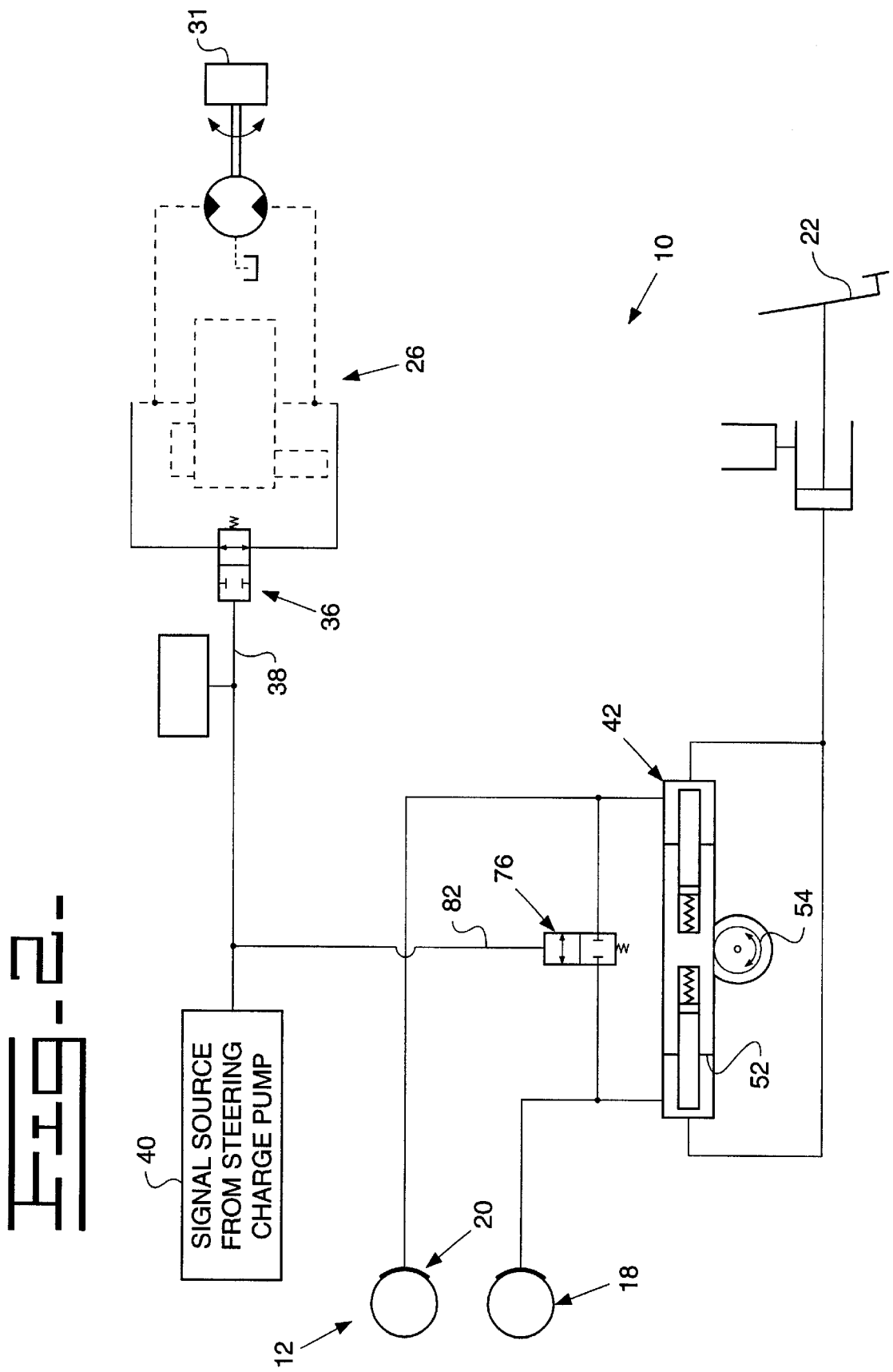
FIG. 2 is another partial diagrammatic and partial schematic representation of the supplemental steering system of FIG. 1, showing the supplemental steering system actuated and brakes of the machine applied.
Figure 4:
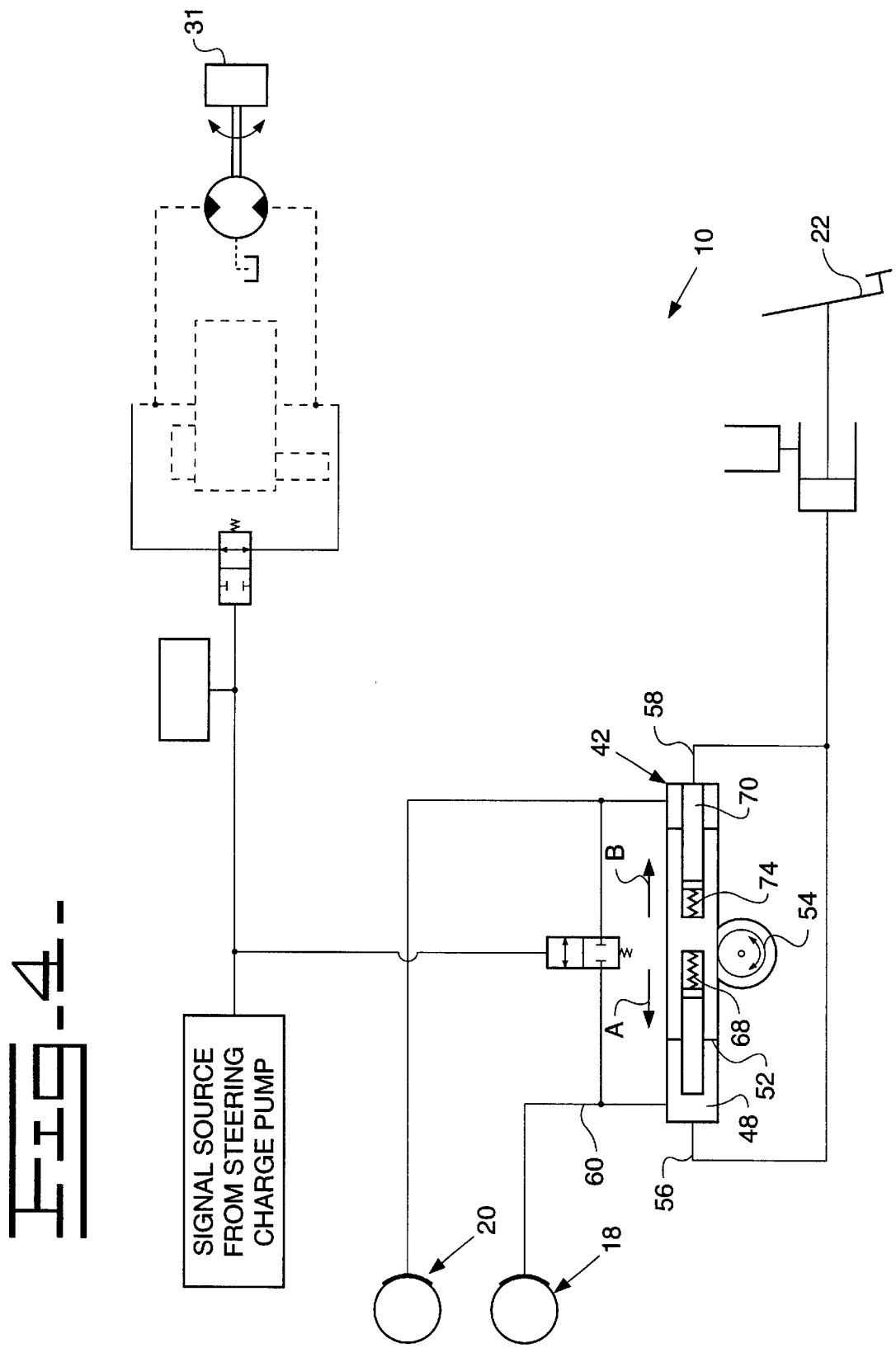
FIG. 4 is still another partial diagrammatic and partial schematic representation of the supplemental steering system of FIG. 1, showing the supplemental steering system actuated, a steering input to the system, and the brake applied.

Supplemental steering system 10 additionally includes a second valve 76 having a first port 78 connected in fluid communication with first brake port 60 of valve 42 and first brake 18, and a second port 80 connected in fluid communication with second brake port 62 and second brake 20, second valve 76 being operable in an open or normal position, as shown, when the normal operating signal from signal source 40 is present at a signal input 82, to allow fluid flow between first port 78 and second port 80 thereof. Second valve 76 is movable to a closed or emergency position, as shown in FIGS. 2–4, to prevent flow between first and second ports 78 and 80 thereof, and thus between brakes 18 and 20, when the normal operating signal is absent. Here again, it should be understood that it is contemplated that the signal from signal source 40 could be a fluid signal or an electrical signal from any suitable source, and valve 76 is to be constructed and operable accordingly.

In operation, when primary steering system 26 is operating normally and valve 76 is in its first or normal position as shown in FIG. 1, fluid flow is allowed between ports 78 and 80 and thus between first and second brakes 18,20 and first and second chambers 48,50. With piston 52 in its neutral position, as shown, brake actuator 22 can be operated to apply brakes 18 and 20, with a straight line braking result, regardless of whether steering input 54 is rotated so as to move piston 52 either into first chamber 48 or second chamber 50 to close first port 56 or second port 58 (not shown). This is due to the ability of the brake fluid to flow through valve 76 between the brakes.

Turning to FIG. 2, system 10 of machine 12 is shown in an actuated condition, due to the absence of the normal operating signal from signal source 40 at signal input 82 of valve 76 and also at signal input 38 of valve 36. As noted above, this is representative of an emergency situation, here a failure or leak in primary steering system 26, an engine stall, or the like, resulting in a low pressure condition in the steering charge pump. This causes valve 76 to move to its closed position to prevent fluid communication between brakes 18 and 20 therethrough, and valve 36 to move to its open position, which has the desired effect of allowing fluid in loop 32 to bypass steering pump 28 thus allowing the steering motor 30 to freely turn, such that machine 12 can be steered by application of brakes 18 and 20.

Now, brakes 18 and 20 can operate independently when steering input 54 is rotated to move piston 52 from the neutral position. While steering input 54 is in the neutral position, as shown, brake fluid under pressure is allowed to be communicated through valve 42 from brake actuator 22 equally to both brakes 18 and 20 to provide normal braking.

Referring to FIG. 3, when steering input 54 of system 10 is rotated to move piston 52 of valve 42 in a direction denoted by the arrow B the predetermined distance such that check valve 70 closes port 58, fluid communication from the second brake 20 to the brake actuator 22 is interrupted. Then, if piston 52 is moved additionally in the direction B by steering input 54, fluid in second chamber 50 will be pressurized by the piston 52 to apply second brake 20, causing machine 12 to turn in the direction of second drive output 16. At the same time, the movement of the direction B of piston 52 will cause the volume of first chamber 48 to increase. Since valve 76 is closed, fluid will be drawn from reservoir 24 of actuator 22 to fill chamber 48. This action is reversed when piston 52 returns to the neutral position.

Referring to FIG. 4, system 10 is shown with piston 52 of valve 42 still in the position moved in the direction B of FIG. 3. Here, however, brake 22 is applied such that the brake fluid pressure in second port 58 forces check valve 70 open in opposition to spring 74. At the same time, because ports 56 and 60 are still in communication through chamber 48, the additional braking input applies both brakes 18 and 20 evenly. Of course, in this instance, as well as in the previous instance with reference to FIG. 3, if steering input 54 is rotated to move piston 52 in the direction of arrow A, the magnitude of the braking effect would be the same, but the direction of steering would be reversed.

Figure 5:
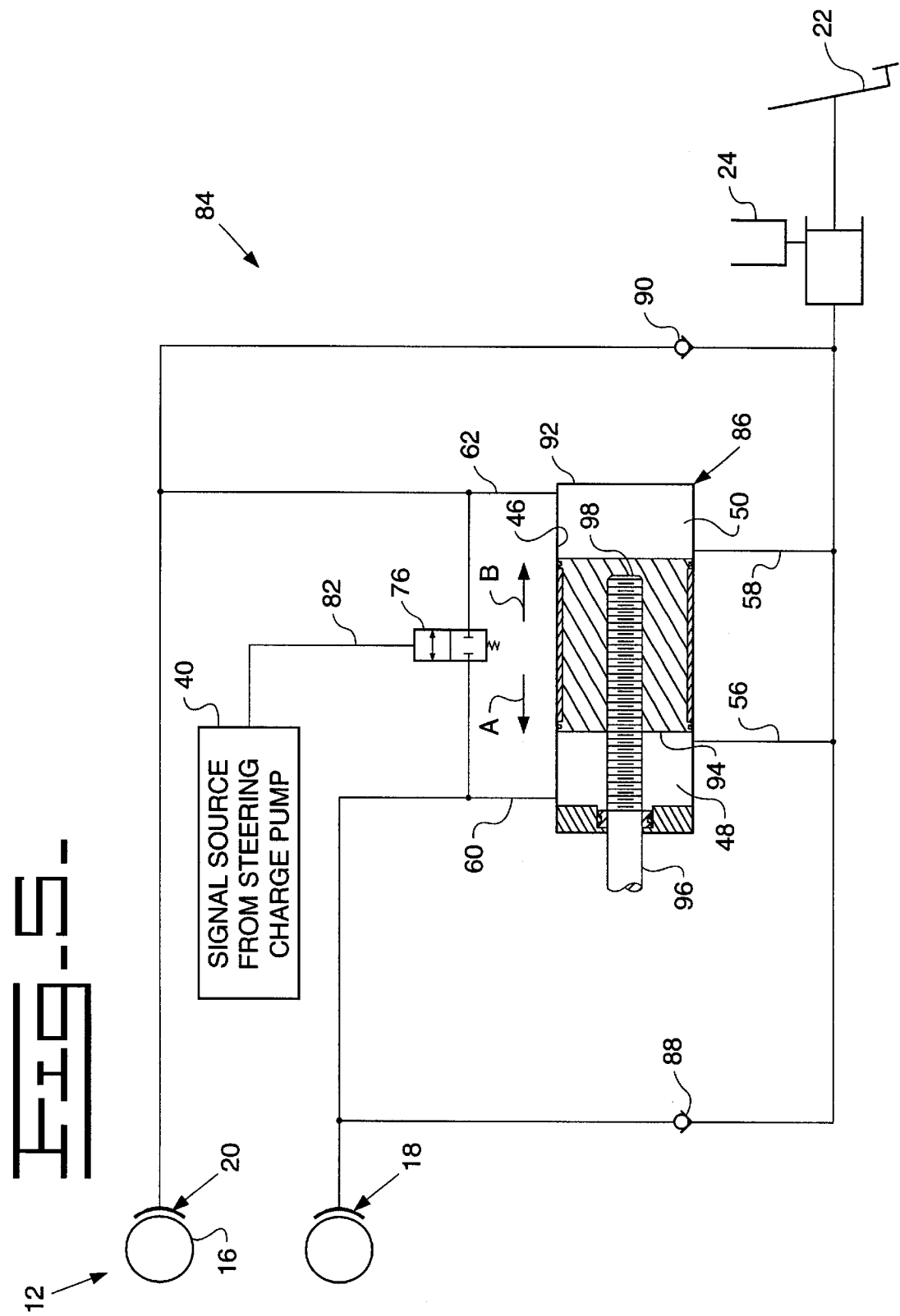
FIG. 5 is a partial diagrammatic and partial schematic representation of another supplemental steering system according to the invention.

Turning to FIG. 5, machine 12 is shown including another embodiment 84 of a supplemental steering system 10 constructed and operable according to the teachings of the present invention, like parts of system 84 and system 10 being identified by like numerals. Essentially, system 84 differs from system 10 in the provision of a differently constructed supplemental steering control valve 86 connected between brake actuator 22 and first and second brakes 18 and 20, and also in the provision of separate check valves 88 and 90 disposed in fluid communication with brake actuator 22 and brakes 18 and 20. Primary steering system 26, although not shown, is still present. Here, second valve 76 is shown connected between first and second brake ports 60 and 62 of valve 86, but is in the closed position to prevent fluid communication therebetween, representative of the absence of a signal on signal input 82 from signal source 40. Valve 86 includes a valve body 92 defining a bore 46 divided into a first chamber 48 and a second chamber 50, a piston 94 being disposed in bore 46, piston 94 being shown in its neutral position. First chamber 48 communicates with first brake port 60 and also a first port 56 connected in fluid communication with brake actuator 22. Likewise, second chamber 50 is in fluid communication with second brake port 62 and through second port 58 with actuator 22. Ports 56 and 58 are equidistant from piston 94 which is movable in the directions denoted by the arrows A and B by the predetermined distance for closing ports 56 and 58, respectively. As another difference, piston 94 is shown connected to a steering input 96 via a threaded connection 98, steering input 96 being movable by a steering wheel or the like (not shown) in the directions A and B for moving piston 94.

In operation, with valve 76 closed and piston 94 in its neutral position, as shown, actuation of brakes 18 and 20 by actuator 22 will be even thereby providing straight line braking. When piston 94 is moved in the direction B sufficiently to close second port 58, second brake 20 will be applied thereby causing vehicle 12 to turn in the direction of second drive output 16. Makeup brake fluid will be communicated to first chamber 48 from reservoir 24 as required. Then, in the event brake actuator 22 is applied, brake fluid flow will be allowed from first port 56 through first chamber 48 to first brake 18, and brake fluid will be allowed through check valve 90 to second brake 20, to provide even brake application, valves 88 and 90 allowing brake fluid flow from actuator 22 to respective brakes 18 and 20 but not in the reverse direction.

Referring briefly again to FIG. 1, machine 12 can optionally include a monitoring system 100 including a sensor in communication with signal source 40 and a signal lamp or the like in an operator cab of machine 12, system 100 being operable for illuminating the signal lamp when the signal for signal source 40 is not present, thus indicating that the present supplemental steering system has been activated.

INDUSTRIAL APPLICABILITY

The present supplemental steering system has utility for use with a wide variety of work machines and vehicles, including wheeled and tracked or belted machines and the like. In the event of a primary or main steering system failure as evidenced by the absence of the normal operating signal from the steering charge pump, or any other suitable and convenient signal source, the present system is automatically activated. In the absence of a steering input to the system when activated, the brakes can be evenly applied with a resultant straight line braking effect. In the event of a steering input, the brakes are applied to cause the machine or vehicle to turn in the direction of the steering input, thereby providing the supplemental steering effect. If, at the same time, the brakes are actuated, check valves are provided which enable an additional, even brake application. Then, in the event primary steering system operation is restored, for instance, the leak is sealed or the engine restarted, the present system will automatically return to the deactivated or standby mode wherein direct, even operation of the brakes by the brake actuator is allowed.

Other aspects, objects and advantages of the present invention can be obtained from a study of the drawings, the disclosure and the appended claims.

What is claimed is:

1. A supplemental steering system for a machine, comprising:
   a first brake;
   a second brake;
   a brake actuator including a reservoir of brake fluid connected in fluid communication with a first port and a second port of a supplemental steering control valve, the supplemental steering control valve including a valve body defining a bore divided into a first chamber and a second chamber, the first port communicating with the first chamber and the second port communicating with the second chamber, a piston located in the bore, the piston being connected to a steering input and having a neutral position generally equidistant between the first and second chambers, the supplemental steering control valve including a first brake port communicating the first chamber with the first brake and a second brake port communicating the second chamber with the second brake;

wherein the piston is movable by the steering input in a first direction a predetermined distance into the first chamber to close the first port such that further movement of the piston in the first direction will urge brake fluid in the first chamber through the first brake port to actuate the first brake, and wherein the piston is movable by the steering input in a second direction a predetermined distance into the second chamber to close the second port such that further movement into the second chamber will urge brake fluid contained therein through the second brake port to actuate the second brake.

2. The supplemental steering system of claim 1, including a first check valve disposed in fluid communication with the brake actuator and the first brake operable for allowing fluid flow from the brake actuator to the first brake when a fluid pressure in the brake actuator is a predetermined amount greater than a fluid pressure condition in the first brake, and a second check valve disposed between the brake actuator and the second brake operable to allowing fluid flow from the brake actuator to the second brake when a fluid pressure in the brake actuator is a predetermined amount greater than a fluid pressure condition in the second brake.

3. The supplemental steering system of claim 2, wherein in the first and second check valves are disposed in the piston of the supplement steering control valve.

4. The supplemental steering system of claim 1, wherein the steering input includes a member adapted for connection to a steering wheel and threadedly engaged with the piston.

5. The supplemental steering system of claim 1, further comprising a second valve, the second valve including a first port connected in fluid communication with the first brake port, a second port connected in fluid communication with the second brake port and a signal input connected in communication with a signal source operable for generating a signal representative of a predetermined fluid pressure condition in a primary steering system, the second valve being operable to allow fluid flow therethrough between the first port thereof and the second port thereof when the signal representative of the predetermined fluid pressure condition is present and to prevent flow between the first port thereof and the second port thereof when the signal is absent.

6. The supplemental steering system of claim 5, wherein the signal is a fluid signal.

7. The supplemental steering system of claim 5, wherein the signal is an electrical signal.

8. The supplemental steering system of claim 5, wherein the predetermined fluid pressure condition in the primary steering system is representative of a normal operating condition of the primary steering system.

9. The supplemental steering system of claim 5, wherein the primary steering system is a differential steering mechanism drivingly connected to a steering motor, the steering motor having first and second fluid ports fluidity connected to a steering pump and a bypass valve disposed between the first and second fluid ports of the steering motor, the bypass valve being spring biased to a flow passing position and movable to a flow blocking position in response to receipt of a signal thereto.

10. The supplemental steering system of claim 9, wherein the bypass valve is movable to its flow blocking position in response to receipt of a pressure signal from the signal source.

11. The supplemental steering system of claim 1, wherein the steering input comprises a rack and pinion.

12. A supplemental steering system for a machine, comprising:

a first brake;
a second brake;
a brake actuator including a reservoir of brake fluid;
a supplemental steering control valve having a first port connected in fluid communication with the brake actuator and a second port connected in fluid communication with the brake actuator, the supplemental steering control valve including a valve body defining a bore divided into a first chamber and a second chamber, the first port communicating with the first chamber and the second port communicating with the second chamber, a piston located in the bore, the piston being connected to a steering input and having a neutral position generally equidistant between the first and second chambers, the supplemental steering control valve including a first brake port communicating the first chamber with the first brake and a second brake port communicating the second chamber with the second brake; and
a second valve including a first port connected in fluid communication with the first brake port, a second port connected in fluid communication with the second brake port and a signal input connected in communication with a signal source operable for generating a signal representative of a predetermined fluid pressure condition in a primary steering system, the second valve being operable in an open position to allow fluid flow therethrough between the first port thereof and the second port thereof when the signal representative of the predetermined fluid pressure condition is present and in a closed position to prevent flow between the first port thereof and the second port thereof when the signal is absent;
wherein when the second valve is in the closed position the piston of the supplemental steering control valve being movable by the steering input in a first direction a predetermined distance into the first chamber to close the first port of the supplemental steering control valve such that further movement of the piston in the first direction will urge brake fluid in the first chamber through the first brake port to the first brake to actuate the first brake, and wherein the piston is movable by the steering input in a second direction a predetermined distance into the second chamber to close the second port of the supplemental steering control valve such that further movement into the second chamber will urge brake fluid contained therein through the second brake port to the second brake to actuate the second brake.

13. The supplemental steering system of claim 12, including a first check valve disposed in fluid communication with the brake actuator and the first brake operable for allowing fluid flow from the brake actuator to the first brake when a fluid pressure in the brake actuator is a predetermined amount greater than a fluid pressure condition in the first brake, and a second check valve disposed between the brake actuator and the second brake operable to allowing fluid flow from the brake actuator to the second brake when a fluid pressure in the brake actuator is a predetermined amount greater than a fluid pressure condition in the second brake.

14. The supplemental steering system of claim 13, wherein in the check valves are disposed in the piston of the supplement steering control valve.

15. The supplemental steering system of claim 12, wherein the predetermined fluid pressure condition in the primary steering system is representative of a normal operating condition of the primary steering system.

\* \* \* \* \*